United States Patent

[11] 3,555,181

[72] Inventor Werner Thommen
Marlboro, N.J.
[21] Appl. No. 734,630
[22] Filed June 5, 1968
[45] Patented Jan. 12, 1971
[73] Assignee Bell Telephone Laboratories, Incorporated
Murray Hill, Berkeley Heights, N.J.
a corporation of New York

[54] AUTOMATIC VIDEO LEVEL CONTROL EMPLOYING IRIS AND AMPLIFIER GAIN ADJUSTMENTS
5 Claims, 3 Drawing Figs.

[52] U.S. Cl. .......... 178/7.2
[51] Int. Cl. .......... H04n 5/38
[50] Field of Search .......... 178/7.2E, 7.92; 315/30, 131

[56] References Cited
UNITED STATES PATENTS
2,901,539 8/1959 Morgan .......... 178/7.2E
3,389,221 6/1968 MacDonald .......... 178/7.2E
FOREIGN PATENTS
1,035,708 7/1966 Great Britain .......... 178/7.2E

*Primary Examiner*—Robert L. Griffin
*Assistant Examiner*—Donald E. Stout
*Attorneys*—R. J. Guenther and William L. Keefauver

ABSTRACT: The amplitude of a signal generated by a video pickup tube is controlled by employing an automatic iris at high illumination levels and an automatic gain control circuit at low illumination levels. The crossover point between iris and gain control is selected so that the gain circuit operates as long as increased illumination and decreased gain improve the signal to noise ratio and picture quality. Above this point, signal level is maintained by an automatic iris which improves the depth of field as illumination increases. Both functions are controlled by sampling a selected field of the output from the pickup tube.

INVENTOR
W. THOMMEN
BY
G. E. Hirsch Jr.
ATTORNEY

AUTOMATIC VIDEO LEVEL CONTROL EMPLOYING IRIS AND AMPLIFIER GAIN ADJUSTMENTS

BACKGROUND OF THE INVENTION

1. Field of the Invention

This invention relates to the automatic control of video signal levels.

Signals representative of video information are commonly generated by a video pickup tube employing an electron scanning beam. In such systems, the light image to be transmitted is typically focused on a target which is then scanned by an electron beam, thereby generating an electrical signal representative of the light intensity at each point on the target. When such a device is employed in an environment where ambient illumination and light reflection are controlled, as in a television studio, the intensity of the video signal may be adjusted manually to accommodate gradual illumination variations. However, where the pickup device must operate in an environment not subject to adequate control, as where the device must operate out of doors or in a private home, light variations are likely to be sudden and pronounced and some form of light responsive automatic signal level control is required. Where the pickup device is required to function without a skilled operator, as in the transmission of video telephone communication where the video pickup instrument is installed directly in the subscriber's home or place of business, reliable automatic signal control is imperative.

Such an automatic level control system, suitable for use in video telephone apparatus, must not only adapt to a wide variety of lighting conditions, but must also be inexpensive and easy to repair. Additional constraints are introduced by the comparatively limited light sensitivity of the commonly used vidicon type pickup device. This requires that the signal level control be such that every increase in illumination be employed to best advantage to improve picture quality.

2. Description of the Prior Art

Two principal types of video amplitude controls are commonly employed in the prior art: mechanical-optical controls and electronic controls.

The mechanical-optical controls are similar to those employed in still or motion picture photography. Several current systems include tinted or polarized filters which are placed before the lens system to reduce the intensity of light incident on the pickup device. Such filters may be mechanically controlled by a photosensitive element adjacent to the pickup tube. Other systems employ an iris mechanism in place of the filter. The iris provides a variable size aperture through which light must pass to reach the pickup tube. The iris is made to open or constrict in response to the ambient illumination level; and may similarly be under control of a photosensitive control circuit.

An additional relevant property of irises, well known in the photographic arts, is the relationship between aperture opening and depth of the field of focus. A given lens system, in conjunction with an iris aperture, has a fixed focal range within which images will be adequately focused on the utilization plane. Objects outside of this range will appear blurred. As the iris aperture becomes smaller, the depth of field becomes enlarged thereby permitting more objects to be focused on the utilization plane at one time. An efficient gain control system should take advantage of this property of the iris.

The electronic level controls vary the target voltage of the pickup tube, regulate the current of the scanning beam or control the gain of an amplifier in which the video signal is processed. The response of the electronic controls is generally more rapid than that of the mechanical.

In these electronic systems, automatic response to light fluctuation is again commonly provided by a photosensitive element, frequently a photosensitive resistor, which is exposed to the same illuminated scene as the camera pickup tube. However, such photosensitive devices often receive light which is not within the field of view of the pickup device. When this occurs, unnecessary operation of the control system is induced with an attendant decrease in picture quality. It is thus desirable that the controlling light intensity measurement be made from within the pickup tube. Prior systems have accomplished this, for example, by introducing an extra target mesh or other element within the pickup tube. However, these known methods are excessively expensive. An efficient level control system should be controlled from within the pickup tube while employing relatively inexpensive equipment.

Several known video signal level control systems combine mechanical filters or irises with electronic cathode voltage regulation and gain circuits. In such systems, the slower mechanical controls compensate for large slow changes in light intensity, while the more responsive electronic controls react to lesser changes. These prior level control systems are not suitable for inclusion in video telephone equipment because they are excessively expensive, because they have poor reliability and a limited range of operation, and because they do not make efficient use of available light.

Thus, it is an object of the present invention to regulate the level of a video signal in a manner suitable for video telephone communications.

SUMMARY OF THE INVENTION

In accomplishing these and other objects, and in accordance with the invention, a video pickup tube employing a constant voltage target is situated behind an automatic iris. The iris is made responsive to light intensity signals generated by a predetermined sector of the pickup tube. The pickup tube output is applied, through a preamplifier, to a variable gain amplifier including an automatic gain control circuit similarly responsive to light intensity signals from the pickup tube.

The range of illumination to which the pickup tube may be exposed is divided into two contiguous illumination subranges; a high subrange and a low subrange. The iris is adjusted to regulate the light incident on the pickup tube in the high illumination subrange, and the automatic gain control circuit is adjusted to regulate the output signal level in the low illumination subrange. The common boundary between the high and low illumination subranges (the crossover point) is selected so that the automatic gain control circuit operates so long as increased illumination and the resulting decreased gain improves picture quality by improving the signal to noise ratio. As illumination increases beyond this boundary, the signal level is maintained by the automatic iris which improves the depth of field as illumination improves.

BRIEF DESCRIPTION OF THE DRAWING

The invention will be fully apprehended from the following description of an illustrative embodiment thereof, taken in conjunction with the appended drawings in which.

DETAILED DESCRIPTION

Figure 1:
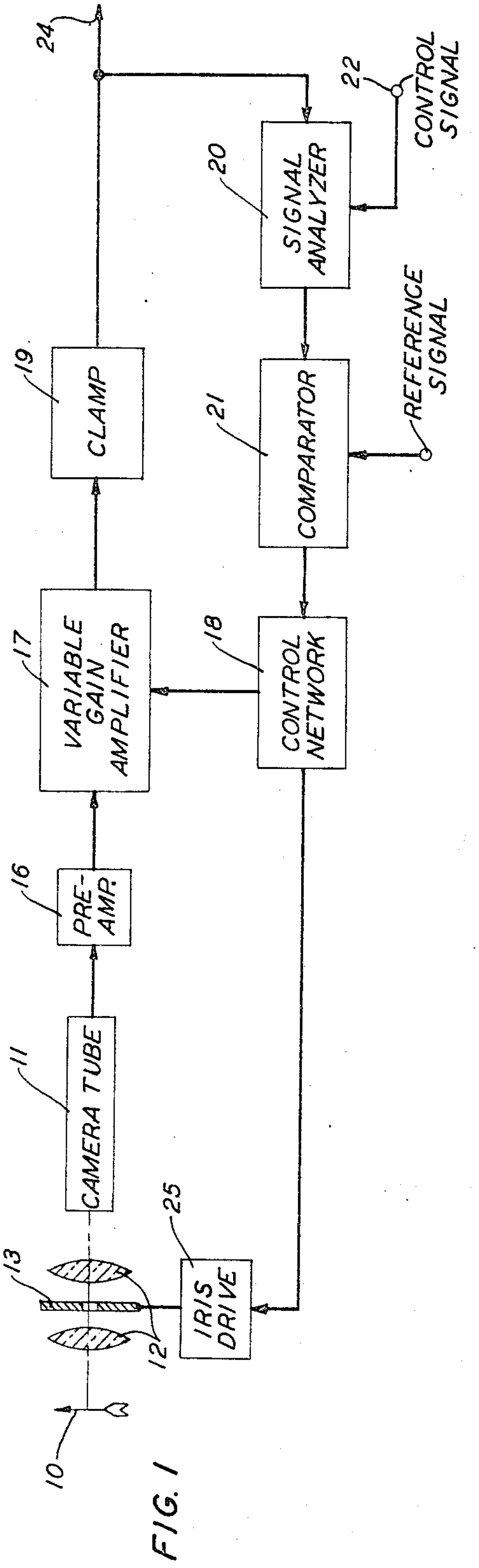
FIG. 1 is a block schematic diagram of an automatic video signal level control system constructed in accordance with the invention.

The automatic signal level control system shown in FIG. 1 is constructed in accordance with the invention and is suitable for inclusion in a video telephone communications system. Such a system is called upon to function without a skilled operator under a great variety of uncontrolled illumination conditions, and, because of limited light sensitivity, should employ every increase in available illumination to improve picture quality. In fulfilling these requirements, the system shown in FIG. 1 employs an automatic iris, 13, and a variable gain amplifier, 17. Iris 13 is located between a desired object, 10, and a pickup tube, 11, and serves to control illumination in a selected high illumination range. Variable gain amplifier 17 serves to regulate the output signal in a low illumination range. The iris and gain circuits are regulated by feedback control circuitry which samples the output signal and adjusts the iris or gain circuit in a manner to be described below.

In the operation of the system shown in FIG. 1, lens system 12 is selected to focus objects such as symbolic object arrow 10 through iris 13 onto the face of pickup tube 11. Appropriate lens systems are well known in the photographic and television arts.

Iris mechanism 13, through which light incident on the face of tube 11 must pass, may be any one of a variety of irises. It may employ crank or gear drive systems but, preferably, will employ low friction meter activated iris blades. By constricting the aperture of iris 13, which is preferably centered at the optical axis of lens system 12, the intensity of light incident on tube 11 and hence the output signal level may be controlled.

The iris system, of whatever design, is under control of iris drive 25 which may be a motor or meter movement appropriate to the iris employed. Iris drive 25 preferably operates on low power, as may be provided by integrated circuits, so that it may be powered directly by the control signals. In an alternate embodiment external power may be supplied from a source, not shown.

Pickup tube 11 converts the image focused on its face into electrical signals. This tube may be any one of many camera tubes, but is preferably a tube o the type described in a copending application of Buck et al. Ser. No. 605,715 which was filed Dec. 29, 1966. This tube employs a fixed target voltage so that the amplitude of the output signal is related directly to the level of illumination on the tube's face plate. The output of tube 11 is applied to preamplifier 16, which is a fixed gain low noise amplifier sufficient to make the noise of variable gain amplifier 17 insignificant by comparison to the level of noise generated by tube 11 and the first stages of the preamplifier.

The signal from preamplifier 16 is applied to variable gain amplifier 17 which may be of any well-known design. The gain of amplifier 17 may be regulated to maintain the output signal at a constant level. Due to AC coupling within amplifier 17, clamp circuit 19 may be employed to restore the DC component of the video signal before inserting sync pulses. The function and operation of such clamp circuits and the use of sync pulses are well known in the television arts.

The clamped video signal is applied from clamp 19 to output point 24 from which it is directed to additional processing and transmitting apparatus, not shown. At the same time, the clamped signal is applied to the control feedback loop via signal analyzer 20. The output of analyzer 20 is a DC voltage signal which is indicative of the amplitude of the video signal and normally lies between the average value and the peak value of the video signal. As an example the output of analyzer 20 may be the average value of the amplitude of the input signal.

In one embodiment, signal analyzer 20 may be disabled by a control signal from point 22. This control signal is preferably generated during the upper and lower 25 percent of the scanned image. Such disablement is required because a video telephone system normally operates in rooms illuminated from above making the upper portion of the image exceptionally bright. In addition, a waist-high image of the person speaking is most frequently photographed. If, as is often the case, the subject is wearing a white shirt, reflected illumination similarly makes the lower portion of the photographed scene exceptionally bright. Thus the lower and upper portions of the scene are likely to be brighter than the more important central region. The automatic gain adjusting circuit will thus not produce adequate illumination in the central picture region unless the upper and lower portions are disregarded by the signal analyzer. Disregarding the upper and lower 25 percent of the picture area has been found to adequately compensate for this phenomenon. The disablement itself is easily accomplished since the undesired portions occur at regular time intervals in the video signal.

The DC signal from analyzer 20, which is representative of the output signal level, is compared to a reference signal in comparator 21. The reference signal is a constant DC voltage derived from a stable voltage source, not shown, which is directly related to the desired signal level in output channel 24. Comparator 21 determines whether the signal from analyzer 20 is above, below or identical with the desired signal standard. If the signal from analyzer 20 is not coincident with the standard, the comparator passes appropriate control signals to control network 18 which adjusts the iris or gain control. Network 18, may be externally powered or may preferably be designed to operate directly from the control signal supplied to it. Network 18 may activate iris 13 and the gain control circuit in amplifier 17 alternately or may activate them both together. In a preferred embodiment, network 18 may merely direct the control signals from comparator 21 to both iris drive 25 and amplifier 17. These devices, 25 and 17, may be adjusted to respond to signals in mutually exclusive voltage ranges so that only one operates at any given voltage.

Figure 2:
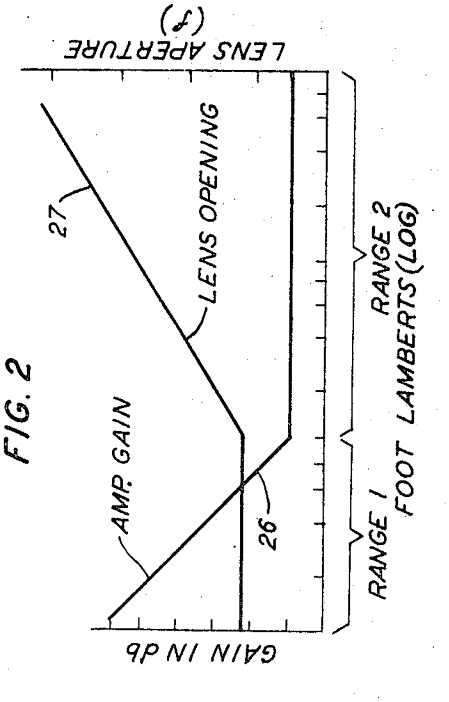
FIG. 2 is a graph depicting the decrease in gain with increased illumination and the decrease in iris opening with increased illumination in a preferred embodiment of the invention.

The selection of iris or gain control may be made at any instant by control network 18 according to whether the system is determined to be operating under high illumination conditions or under low illumination conditions. In order to facilitate this determination, the range of possible illumination in the vicinity of object 10 is considered to be divided into two illumination subranges. These subranges may be contiguous as shown in FIG. 2 (Range 1 and Range 2) or may be overlapping. If the system is found to be operating in the low illumination subrange, control network 18 activates the gain circuit in amplifier 17, reducing gain as illumination increases and thereby maintaining a constant output signal level. If the system is operating in the high illumination subrange control network 18 maintains the gain of amplifier 17 constant and adjusts iris 13 to limit signal level.

If two contiguous illumination subranges are employed, the boundary between them may be selected according to the following considerations.

As is well known, a video signal contains noise in addition to the desired video information. Such noise is partially produced by the camera tube and associated electronics. The ratio of signal amplitude to the associated noise level is conveniently referred to as the signal to noise (S/N) ratio. When the S/N ratio is low, the noise appears in the image reproduced from the video signal as "snow" or the picture will have an excessively "grainy" quality. As the s/n ratio increases from this low point, the quality of the picture improves. However, the rate of visible improvement in picture quality with increase in S/N ratio is not linear and when the S/N ratio is sufficiently high further increase does not appreciably improve picture quality.

When low ambient illumination surrounds object 10, amplifier 17 must have a relatively high gain in order to generate suitable signals at point 24. This in turn creates a low S/N ratio. As illumination increases the gain of amplifier 17 may be reduced and the S/N ratio will be increased. At the same time, picture quality is improved as described above.

The low illumination subrange, in one embodiment of the invention, is then defined as extending from the lowest expected illumination upward to the illumination point where reduced gain and the attendant increase in S/N ratio no longer appreciably improve picture quality. The high illumination subrange then extends upward from this illumination point. As an example, if it is anticipated that the highlight luminance will range from 3 to 1,000 foot lamberts due to change in the illumination, the low illumination subrange may be extended from 3 to 16 foot lamberts highlight luminance and the high subrange from 16 to 1000 foot lamberts.

The relation between the high and low subranges is shown in FIG. 2, which includes two curves; the first (curve 26)

represents the gain of amplifier 17 versus highlight luminance. The second (curve 27) represents the ratio of focal length to iris diameter (*f* stop) versus highlight luminance. It will be seen that the illumination range of interest has been divided into two subranges numbered 1 and 2 in FIG. 2.

Figure 3:
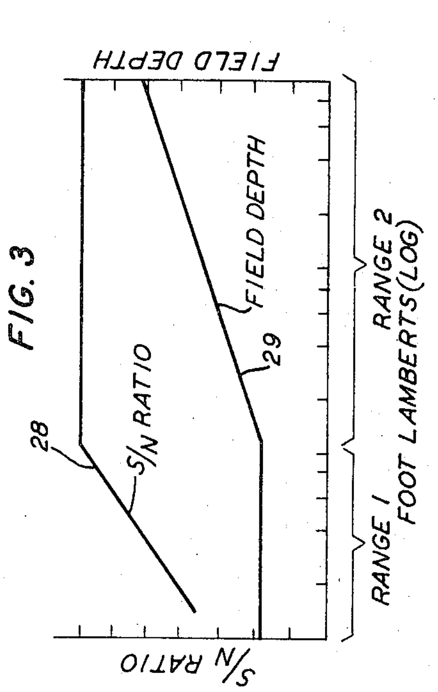
FIG. 3 graphically depicts increase in signal to noise ratio and the increase in depth of field which results from the gain and iris adjustments depicted in FIG. 2.

In Range 1, the iris aperture is held constant, usually at the fully open position, and the gain of amplifier 17 is decreased. In Range 2, the gain of amplifier 17 is held constant and the aperture size of iris 13 is decreased (i.e., the *f* is increased). Throughout the range of interest, the output signal level is maintained constant, however the signal to noise ratio and depth of field will vary as shown in FIG. 3. Thus, in Range 1 it will be seen that the signal to noise ratio increases (curve 28) as illumination increases, while in Range 2 the signal to noise ratio is constant and the depth of the field of focus (curve 29 ) increases as illumination increases.

It is to be understood that the selection of the high and low subranges and the rate of change of gain and aperture shown in FIGS. 2 and 3 are examples only, and that numerous other values may be employed in accordance with the invention.

It is to be further understood that the above described arrangements are merely illustrative of application of the invention. Other arrangements may be described by those skilled in the art without departing from the spirit and scope of the invention.

I claim:

1. In a video transmission system including video pickup means for converting the light image of a scene into electrical signals and means for amplifying said signals, an automatic video level control comprising: adjustable aperture means responsive to a first control signal for controlling the intensity of light from said scene which reaches said pickup means, a gain control circuit associated with said amplifying means and responsive to a second control signal, and control means responsive to a sample of said amplified electrical signals representative of a predetermined portion of said light image for developing said first control signal in a selected high illumination range and for developing said second control signal in a selected low illumination range.

2. An automatic video level control as defined in claim 1 wherein, said low illumination range extends from a selected low illumination to the illumination level at which additional illumination does not appreciably improve picture quality, and wherein the high illumination range is contiguous with the low illumination range.

3. An automatic video level control as defined in claim 2 wherein said low illumination range extends from a highlight luminance of 3 to 16 foot lamberts and said high illumination range extends from 16 to 1000 foot lamberts.

4. An automatic video signal amplitude control system comprising: a control circuit; an iris under control of signals from said control circuit; a video camera tube; a preamplifier supplied with signals from said video camera tube; a controlled variable gain amplifier supplied with signals from said preamplifier, the gain of said amplifier being under control of signals from said control circuit; a signal analyzer supplied with signals from said variable gain amplifier for disabling said control device at preselected times; and a comparator supplied with a control signal from said analyzer and with a reference signal for comparing said control signal with said reference signal and for supplying signals to said control circuit, said control circuit actuating said iris in a selected high illumination range and controlling said gain of said variable gain amplifier in a selected low illumination range.

5. An automatic video signal amplitude control system, as defined in claim 4, wherein said signal analyzer disables said control device during the top one-quarter and during the bottom one-quarter of each video frame.